(12) United States Patent
Guim Bernat et al.

(10) Patent No.: US 12,511,071 B2
(45) Date of Patent: Dec. 30, 2025

(54) ADVANCED INTERLEAVING TECHNIQUES FOR FABRIC BASED POOLING ARCHITECTURES

(71) Applicant: Intel Corporation, Santa Clara, CA (US)

(72) Inventors: Francesc Guim Bernat, Barcelona (ES); Karthik Kumar, Chandler, AZ (US); Alexander Bachmutsky, Sunnyvale, CA (US); Marcos E. Carranza, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 17/710,657

(22) Filed: Mar. 31, 2022

(65) Prior Publication Data

US 2022/0222010 A1 Jul. 14, 2022

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC .... G06F 3/0619; G06F 3/0634; G06F 3/0659; G06F 3/0673; G06F 3/0679
See application file for complete search history.

(56) References Cited

U.S. PATENT DOCUMENTS

| | | | |
|---|---|---|---|
| 8,386,727 B2 * | 2/2013 | Olarig | G06F 13/4221 |
| | | | 711/E12.079 |
| 2003/0126343 A1 * | 7/2003 | Olarig | G06F 13/4221 |
| | | | 711/E12.079 |
| 2016/0246714 A1 * | 8/2016 | Soulie | G06F 13/1647 |

* cited by examiner

*Primary Examiner* — Jane W Benner
(74) *Attorney, Agent, or Firm* — Essential Patents Group, LLP; Christopher K. Gagne

(57) ABSTRACT

Methods and apparatus for advanced interleaving techniques for fabric based pooling architectures. The method implemented in an environment including a switch connected to host servers and to pooled memory nodes or memory servers hosting memory pools. Memory is interleaved across the memory pools using interleaving units, with the interleaved memory mapped into a global memory address space. Applications running on the host servers are enabled to access data stored in the memory pools via memory read and write requests issued by the applications specifying address endpoints within the global memory space. The switch generates multi-cast or multiple unicast messages associated with the memory read and write requests that are sent to the pooled memory nodes or memory servers. For memory reads, the data returned from multiple memory pools is aggregated at the switch and returned to the application using one or more packets as a single response.

24 Claims, 9 Drawing Sheets

ADVANCED INTERLEAVING TECHNIQUES FOR FABRIC BASED POOLING ARCHITECTURES

BACKGROUND INFORMATION

One of the emerging trends in the industry is memory pooling—where multiple server nodes can extend their memory space by requesting memory from, and mapping memory from a "memory pool" onto their own. The memory pool itself could be a memory server (a server with dense population of memory, for the purposes of providing memory as a pool to other servers). A disaggregated architecture may include one or more pooled memory drawers/sleds/chassis in a rack to implement similar functionality. For the node that gets additional memory via pooling, the ability to put and accessing objects on the memory pool "as if" they were part of the same local address space enables lower latency communication by avoiding additional overheads from network protocols, etc.

Some of the key candidates for memory pooling are in-memory databases, such as SAP HANA, which is an in-memory, column-oriented, relational database management system developed and marketed by SAP SE. When in-memory databases are deployed on premises, the hardware, including processor and memory resources, may be specifically tailored and dedicated to an enterprise's needs. However, this scenario is not applicable to cloud-based deployments hosted by third-party cloud service providers (CSPs), where compute and memory resources are shared among multiple tenants. As more in-memory databases and other candidates for memory pooling are deployed to the cloud, memory pooling is projected to see wider adoption.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
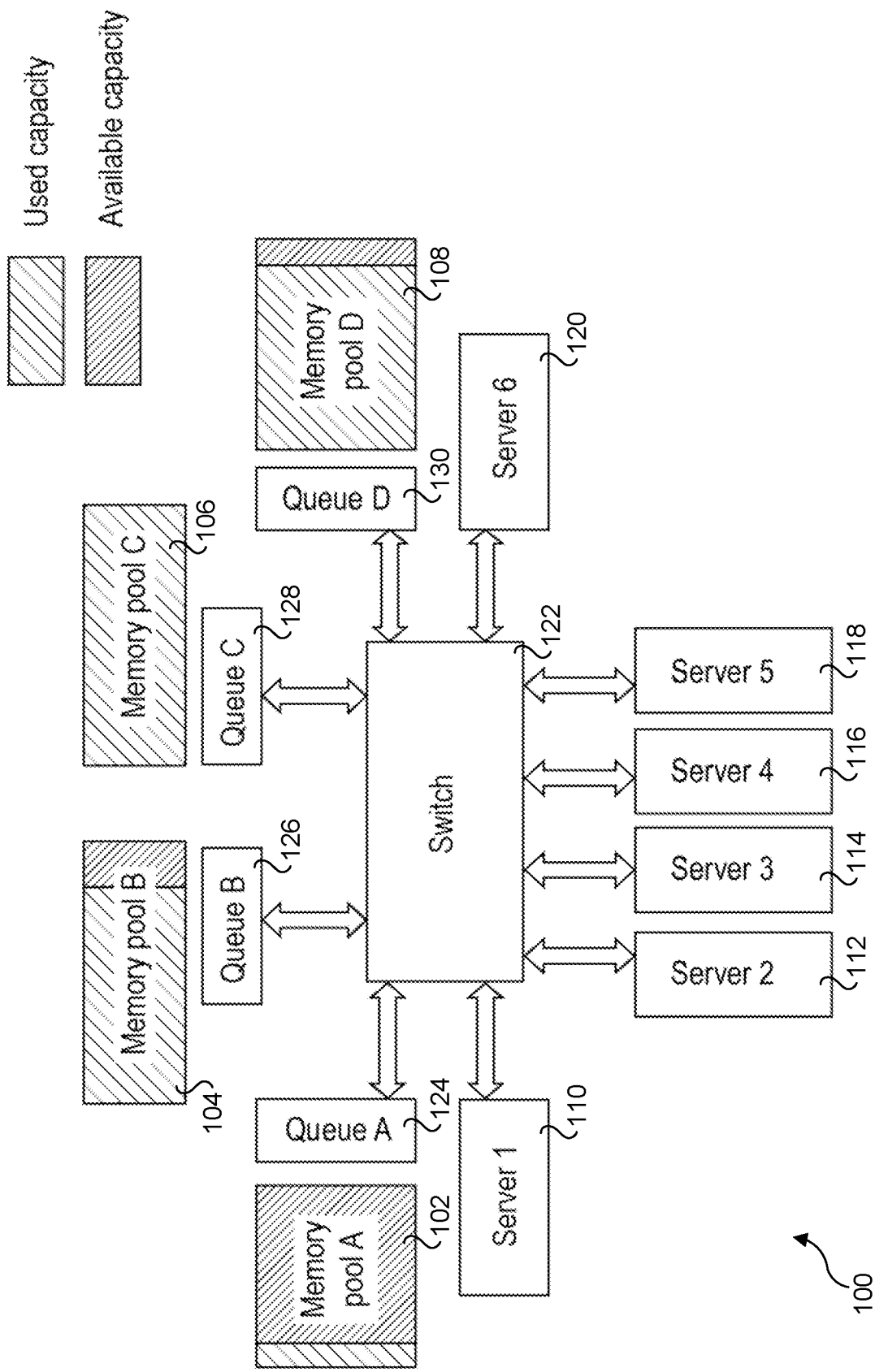
FIG. 1 is a diagram illustrating an example of a system employing shared memory resources deployed in memory pools.

Embodiments of methods and apparatus for advanced interleaving techniques for fabric based pooling architectures are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Figure 2:
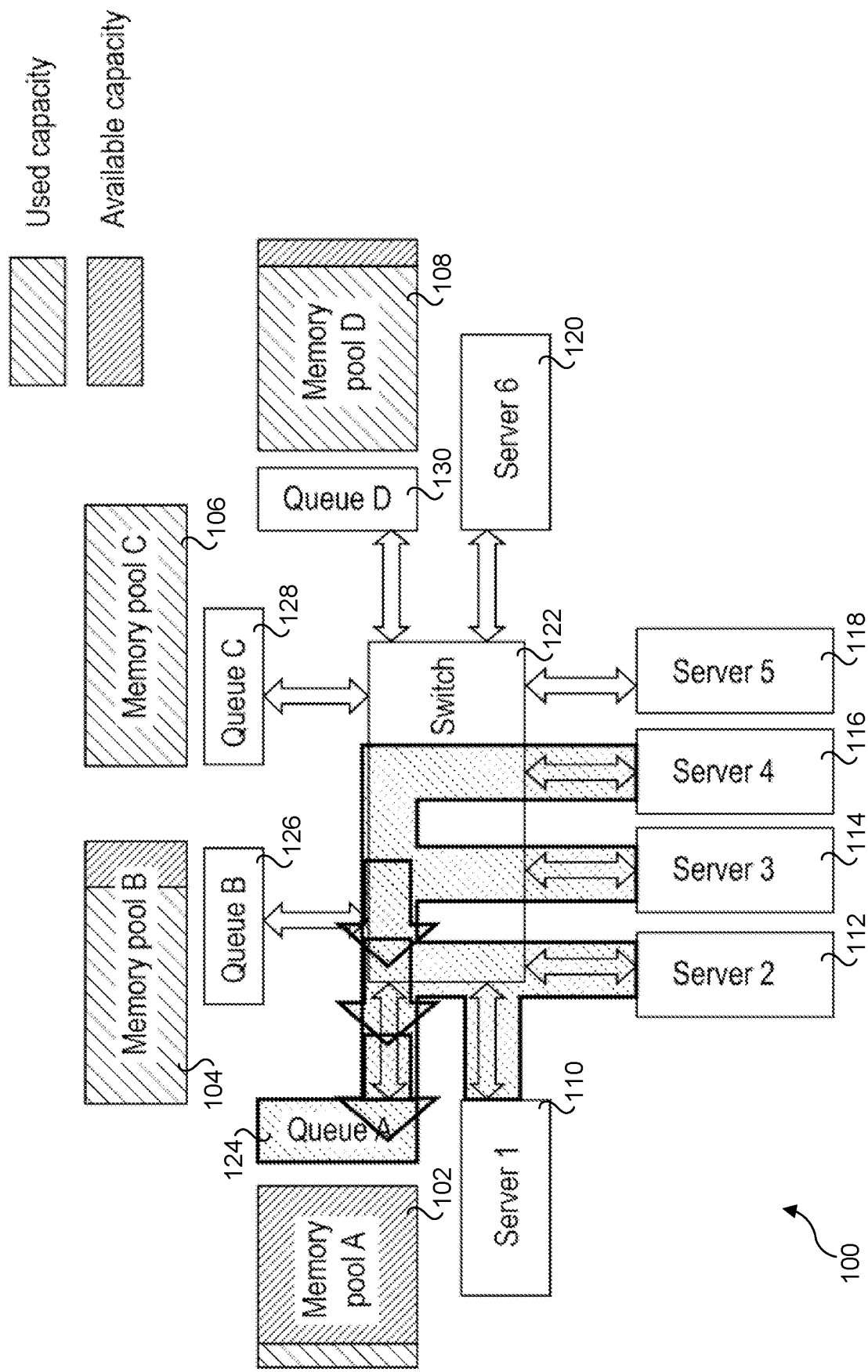
FIG. 2 is a diagram illustrating an example of a memory access bottleneck under the system of FIG. 1.

FIGS. 1 and 2 show a system 100 employing shared memory resources. System 100 includes four memory pools 102, 104, 106 and 108 (respectively labeled memory pool A, B, C, and D) and six servers 110, 112, 114, 116, 118, and 120 (respectively labeled server 1, 2, 3, 4, 5, and 6) coupled to a switch 122. Each of memory pools A, B, C, and D employ a respective queue, as depicted by queues 124, 126, 128, and 130 (respectively labeled queue A, B, C, and D). Servers 110, 112, 114, 116, 118, and 120 employ conventional server architectures including compute and local memory resources (e.g., DRAM DIMMs coupled to a CPU). These servers may use a combination of local memory and pooled memory.

As shown by the legend, used capacity for the memory in the memory pools is shown in a first crosshatch pattern, while available capacity is shown by a second denser crosshatch pattern. As shown, memory pools B and D have limited available capacity, while memory pool C has no available capacity, as their memory capacities have already been allocated by some set of servers. Meanwhile, most of the memory for memory pool A has yet to be allocated and is available.

As mentioned above, in-memory databases, such as SAP HANA, are generally deployed on premises. In-memory databases may also be deployed using "private" cloud provisioning using dedicated and non-shared compute and memory resources. These in-memory databases are often overprovisioned for worst-case scenarios requiring maximum expected memory utilization. For example, a weekly or biweekly spike required to run payroll queries, or quarterly spike to deal with end of quarter query processing. This is not any issue for an on premise or private cloud deployment, as adequate compute and memory resources may be implemented by adding servers and/or memory. However, this becomes problematic under conventional pooled memory, such as employed by system 100.

FIG. 2 shows a manifestation of this problem. Now let us consider the end of quarter spike alluded to above—for example, say a set of analysts are submitting very memory intensive queries to in-memory databases that reside on servers 1, 2, 3, and 4. Now, there is a need to carve out memory from the pool for usage—and it may well be that the likely candidate is memory pool A, which may result in memory traffic flows during the end of quarter close similar to that shown in FIG. 2.

In this instance, each of servers 1, 2, 3, and 4 allocate memory from memory pool A. As a result, there is a high demand for accessing memory in memory pool A and in queue A. This creates a bottleneck that reduces performance. It also places a heavy burden on queue A.

There are two key insights to be considered here. First consider memory capacity. Memory pooling is designed to handle requirements for spikes in memory capacity, often due to seasonal or temporal events like payroll at the end of a week or biweekly, or end of quarter or just temporary traffic spikes caused by multiple simultaneous transactions from multiple servers. What needs to be factored in, is that multiple applications and databases often have the same seasonal requirements:—at end of quarter for example, it may well be that there is a spike in capacity requirements from multiple servers for intensive query processing (these are typically the analytics queries that analysts run to get various insights into the performance or behavior of various metrics over the quarter). The servers are trying to send access requests with the maximum throughput available locally, which is usually the link capacity. If we assume (as an example) that data center network links are 100 Gbps each, the server that stores data in pooled memory will effectively send it with 100 Gbps throughput. Multiple servers sending data at the same time (either because of temporal event scheduling or just probability chance in regular traffic distribution) will cause a N×100 Gbps spike into potentially a single 100 Gbps port of pooled memory. Connecting multiple ports in parallel from the network switch to pooled memory does not help, because it just affects the probability of the problem (practically, number N above), not the problem itself.

The second consideration is bandwidth. The spike in capacity is accompanied with a spike in memory bandwidth requirement, and the memory pool needs to handle not only the additional capacity required, but also the additional bandwidth required. Suppose under system 100 each server is capable of generating up to 500 GB/s of bandwidth demand; multiplying this ×4 servers yields a potential bandwidth demand of up to 2 TB/s. If we assume a 70-30 local-remote pool bandwidth split that is seen during the spike, we are still talking about 600 GB/s of additional memory bandwidth demand to the pool A, which can easily overwhelm the resources of the memory pool A.

What has also been observed is that there could be an abundance of memory in the other memory pools that has been allocated but may not be actively used during the spike. As a result, during seasonal or temporally predictable events like end of quarter or weekly close or a regular traffic spike, there is often a simultaneous spike in capacity and bandwidth.

In accordance with aspects of the embodiments described and illustrated herein, the memory capacity and bandwidth problems are addressed by augmenting switch capabilities to provide mechanisms to memory pooled architectures, or any other resource pooling with similar characteristics, to use transparently smart memory interleaving methods that are network aware to have bandwidth augmentation. Additional augmentation is employed by the memory pools (and/or their host servers) to implement the memory interleaving. The memory interleaving is implemented in a manner that is transparent to application accessing the memory; from the application perspective, the memory appears to be local (system or main) memory.

The approach employs a pooled memory request disaggregation and response aggregation scheme that is managed by the switch. The switch as the central entity has visibility into the traffic across all the memory pools. An application, while requesting memory from the pool, can pass a hint as to the type of memory required—e.g., in addition to capacity, it can pass a hint concerning the usage, for example H, M, L (High, Medium, Low) for bandwidth, and/or interleaved or non-interleaved mode, and/or in-memory compute use (also potentially hinting on non-interleaved mode preference). The switch can use these hints to allocate memory from the memory region that could be disaggregated across multiple memory pools (similar to interleaving across memory controllers within the server). This interleaving is managed by the switch, in the case of high bandwidth requirements, so when the application issues memory load/store instruction for a given size, when that size exceeds some threshold the switch splits the request into N separate requests, each one going to a different memory pool. When responses (OK for store or data for load, for example) are coming back, the switch will aggregate them into a single response to the application. This is facilitated by memory interleaving logic in the switch across memories served by the switch. The threshold size is configurable and will vary depending on the level of interleaving applied for a given memory region.

Figure 3:
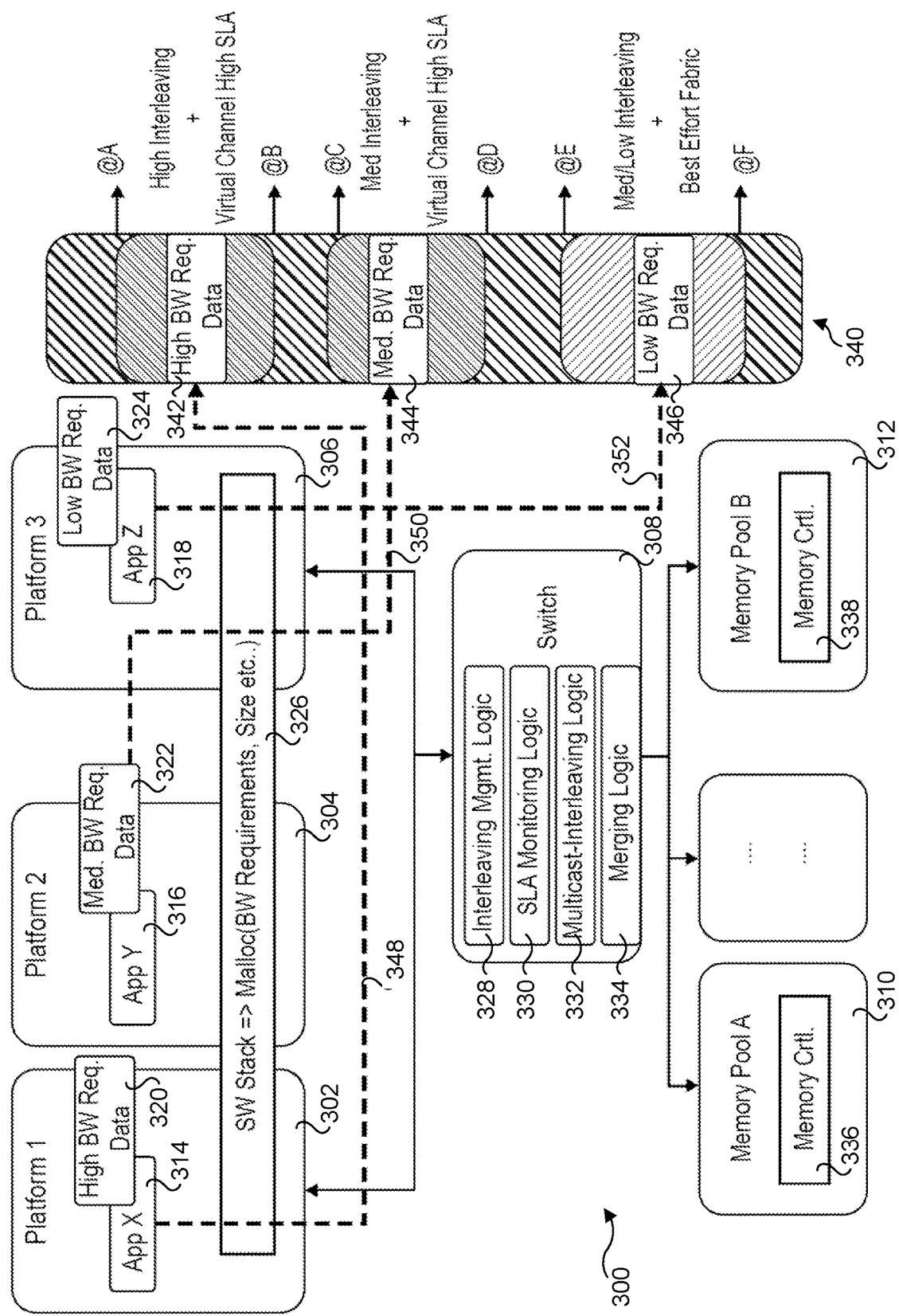
FIG. 3 is a diagram illustrating system components for implementing memory interleaving across memory pools, according to one embodiment.

In addition to other aspects and functions, embodiments employ the following elements. First, the software stack on the platform (both operating system (OS) and network stack) expose a modified interface for pooled memory allocation that allows specifying what is the required level of memory bandwidth required for a memory chunk being allocated, such as through use of hints. For example, as shown in FIG. 3 and described below, three type of memory bandwidth are shown: High, Medium, and Low. Each memory type is mapped to a respective region in a global address memory space. In addition, the hint may specify the use of in-memory compute or explicitly define an interleaved or non-interleaved memory type.

The interface may provide enabling turning the interleaving capability on and off. This capability may be implemented as an explicit part of an application program interface (API) or may be implicit by memory type definition. While most of existing memory interleaving implementations have very limited number of memory regions with disabled interleave, the concept here is to dynamically allocate the requested memory from one of interleaved or non-interleaved memory spaces. There are also use cases with in-memory compute capabilities that might hint the need to use non-interleaved mode to enable such compute on the entire data as opposed to only a chunk of the interleaved data.

Second, the switch provides a new interface and logic that is used to implement the first element. This logic is responsible for selecting the amount of end pooled memory servers or nodes required to achieve the required level of memory bandwidth and potentially reserve fabric resources (e.g., specific memory bandwidth of a virtual channel). The switch works with the end memory pools to allocate the required memory chunks that will be interleaved. As described and illustrated below, interleaving may also include some latency considerations, and plays with different interleaving sizes to achieve different pooling properties.

Third, the switch provides a new interface and logic to process memory Reads and Writes for a particular memory range. The logic will be responsible for creating corresponding unicast or multicast messages to split or gather the required data and respond with a single response to the originator of a memory access request.

Under another aspect of some embodiments, the first and second elements are expanded when the fabric resources are scarce and are insufficient to service a particular request by stealing temporary bandwidth from the best effort address ranges. Also, an embodiment covers cases where different groups of pools can be mapped into the same interleaving type to apply load balancing schemes.

FIG. 3 shows a system 300 illustrating an exemplary implementation of the interleaving scheme and associated logic implemented in a switch. System 300 includes three platforms 302, 304, and 306 coupled to a switch 308, which is also coupled to multiple memory pools including memory pools 310 and 312 (also labeled memory pool A and memory pool B).

Platforms 302, 304, and 306 are representative of various types of platforms, such as servers, server blades, server modules, and other compute nodes, such as but not limited to data center environments. The platforms may also be referred to herein, including the claims as host servers. Each of platforms 302, 304, and 306 include one or more CPUs (e.g., multi-core processors or System on Chip (SoC) components coupled to local memory (e.g., multiple DRAM DIMMs) and including a network or fabric interface (all not separately shown in FIG. 3 for simplicity). Platforms 302, 304, and 306 include software such as an operating system and one or more applications that execute on cores in the one or more CPUs. Platforms 302, 304, and 306 deploy various types of software architectures, including virtualized environments employing virtual machines (VMs) or containers. Such virtual environments may employ any of Type-1 and Type-2 hypervisors/Virtual Machine Monitors (VMMs) or a container virtualization layer or similar, such as but not limited to container virtualization employed by Kubernetes® and Docker®. These are all known software architectures, with the particular software architecture being outside the scope of this disclosure.

For illustrative purposes, platform 302 is executing an application 314 (App X), while platform 304 is executing an application 316 (App Y) and platform 306 is executing an application 318 (App Z). Application 314 employs high bandwidth requirement data 320. Application 316 employs medium bandwidth requirement data 322, while application 318 employs low bandwidth requirement data 324. Platforms 302, 304, and 306 employ a software stack 326 that is configured to allocate memory as supporting one or more requested bandwidth requirements, size, and other optional parameters used in a memory allocation (Malloc) request.

As will be recognized by those skilled in the art, platforms 302, 304, and 306 may also be running additional applications including applications with different bandwidth requirements. Moreover, some applications may be segregated for other application such that a first set of application employs the interleaving approaches disclosed herein, while a second set of application employ conventional memory access schemes.

Switch 308 generally includes conventional switch components and circuitry such as ports, ingress and egress buffers, crossbar circuitry, etc. In addition, switch 308 further includes interleaving management logic 328, Service Level Agreement (SLA) monitoring logic 330, multi-cast interleaving logic 332, and merging logic 334. Further details of the switch architecture and components are described and illustrated below.

Memory pools 310 and 312 (memory pools A and B) are abstracted representations of hardware and associated logic used to implement a memory pool. The associated logic includes pooled memory controllers 336 and 338. As described above, some memory pools may employ a memory server. Under the disaggregated architectures illustrated below, a memory pool may be implemented by a pooled memory "node," such as, but not limited to a Service Class Memory (SCM) node. Generally, a pooled memory node may employ a server frontend (referred to a memory server herein) or may be "headless," meaning the logic for implementing the pooled memory functionality may be implemented using some form or combination of embedded logic, as opposed to software running on a server. In addition to SCM nodes, hybrid pooled memory nodes may also be used that including volatile DRAM DIMMs in combination with some non-volatile storage. Under another option, the pooled memory is DRAM DIMMs without non-volatile storage.

Switch 308 interacts with memory pools 310 and 312 to perform memory interleaving supporting different bandwidth levels. All or a portion of the collective memory in memory pools 310 and 312 are aggregated into a global memory space 340 having different regions allocated to different interleaving and bandwidth levels, with optional regions that use conventional memory access patterns. As illustrated, interleaved memory region 342 from address A to address B is allocated for high bandwidth requirement data and employs a (relatively) high level of interleaving and a virtual channel providing a (relatively) high SLA. Interleaved memory region 344 from address C to address D is allocated for medium bandwidth requirement data and employs a (relatively) medium level of interleaving and a virtual channel providing a (relatively) high SLA. Meanwhile, interleaved memory region 346 from address E to address F is allocated for low bandwidth requirement data and employs a (relatively) medium to low level of interleaving and a best effort fabric.

Generally, the remaining regions of global memory space 340 may be employed for either conventional non-interleaved memory access or may employ other levels of memory interleaving that is not specifically shown or listed. Likewise, these interleaved memory regions may employ different virtual channel SLA and/or best fabric effort access levels.

As shown by a virtual channel path 348, application 314 accesses memory in interleave memory region 342 that is configured to support high data bandwidth requirements. Similarly, as shown by a virtual channel path 350, application 316 accesses memory in memory range 344 that is configured to support medium data bandwidth requirements. Meanwhile, as shown by a virtual channel path 352, application 318 access memory in memory range 346 that is configured to support low data bandwidth requirements. As described in further detail below, these virtual channels employ multiple datapaths to access memory from multiple memory pools.

Most of the intellectual property (IP) for implementing the memory interleaving schemes resides in the switch, while there also are some hooks in the memory controller on the memory pool and on the software memory management stack as explained in further detail below. In addition, the memory controller employs allocation logic to support allocation of interleaved memory.

Figure 4:
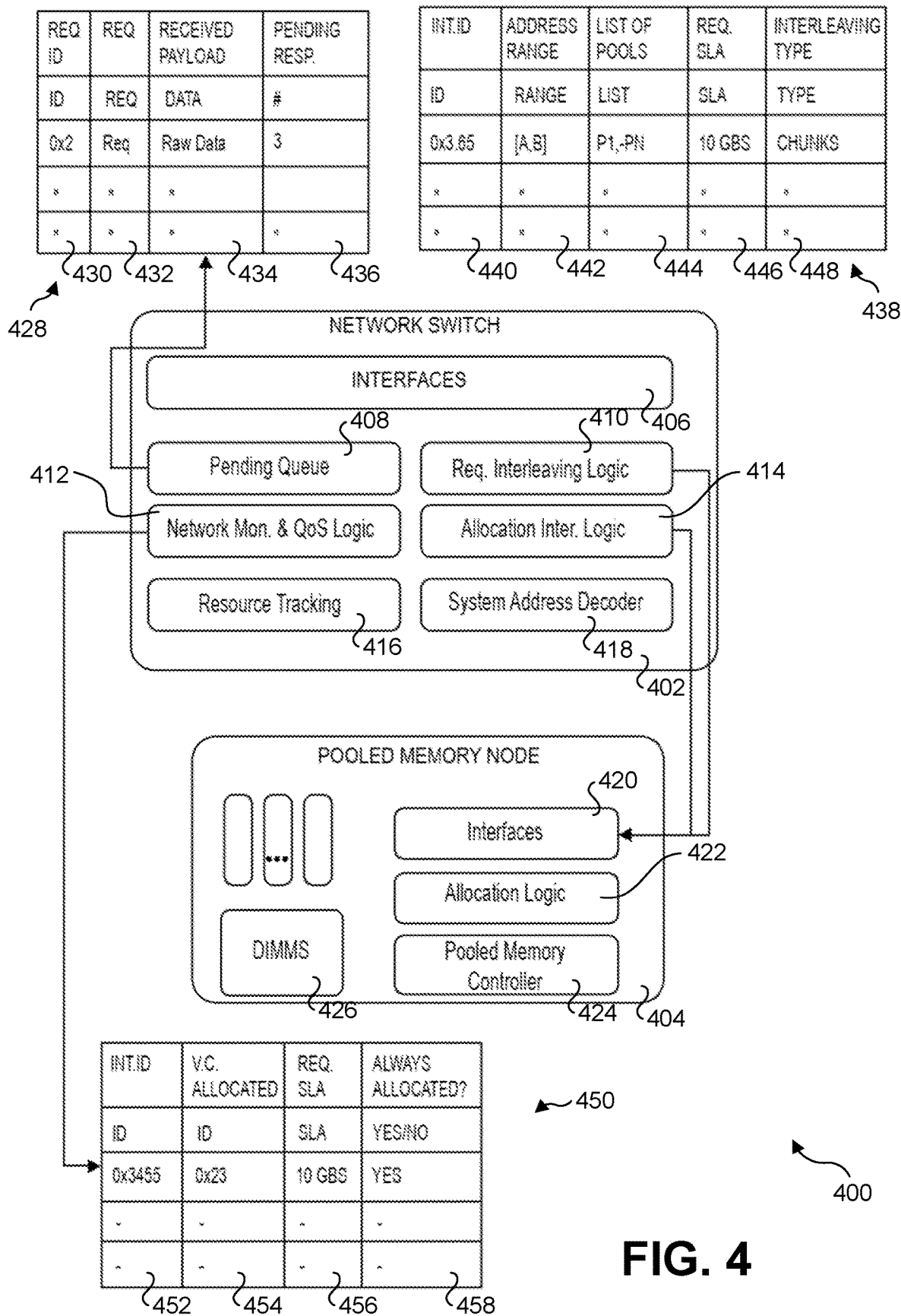
FIG. 4 is a diagram illustrating further details of the system components of FIG. 3.

FIG. 4 shows a diagram 400 illustrating further details of a network switch 402 and a pooled memory node 404. Switch 402 includes interfaces 406, a pending queue 408, requested interleaving logic 410, network monitor and Quality of Service (QoS) logic 412, allocation interleaving logic 414, resource tracking 416, and a system address decoder 418. Pooled memory node 404 includes interfaces 420, allocation logic 422, a pooled memory controller 424, and DIMMs 426.

Interfaces 406 represents two new interfaces provided by switch 402. These include a new interface and logic that is responsible for processing new memory allocation requests generated by the software stack. In one embodiment, the interface allows the software to specify:
1. Memory size required.
2. The desired level of memory bandwidth required.
3. If the requirement is a best or must effort type of requirement.
4. Explicit interleaving or non-interleaving mode (optional).

The switch also provides a new interface to process Reads and Writes for a particular memory range. The logic is responsible for creating the corresponding unicast or multicast messages to split or gather all the applicable data and respond with a single response to the originator.

Allocation interleaving logic 414 is responsible for selecting the amount of end pooled memory servers to be used to achieve the required level of memory bandwidth and potentially reserve fabric resources (e.g., specific memory bandwidth of a VC). The switch works with the end memory pools via interfaces 420 to allocate the requested memory chunks that will be interleaved. Interleaving logic 414 also employs some latency considerations and plays with different interleaving sizes to achieve different pooling properties. The interleaving logic may also take into account security considerations of the initiator, such as using tenant-specific memory pools or always encrypted memory for a particular initiator enclave. Further details of allocation interleaving logic 414 are described in illustrated below with reference to flowchart 500 in FIG. 5.

Pending queue logic 408 maintains data in a request table 428. The fields in request table 428 include a request identifier (ID) 430, a request type 432, a received payload data type 434, and a pending responses field 436. Pending responses are used to gather request data from multiple responses and combine them into a single response that is returned to the originator of a given memory access request.

Switch 402 also maintains an interleaving configuration table 438. This table includes an interleave ID field 440, an address range field 442, a list of pools field 444, a required SLA field 446 and an interleaving type 448. Interleave ID field 440 includes an identifier for a corresponding range in the global memory space (for a given interleaving configuration table entry), with the start and end range addresses specified in address range field 442. List of pools 444 contains a list of memory pools that are employed for the interleaving configuration table entry. The required SLA may contain optional SLA-related data, such as a minimum bandwidth. Interleaving type 448 specifies the type of memory allocation interleaving is applied. In this example, interleaving is applied at the chunk level—that is chunks of memory employ interleaved memory, where the memory for a chunk are allocated from different memory pools.

Network monitoring and QoS logic 412 maintains a QoS configuration table 450 including entries associated virtual channels that are used for accessing memory from the memory pools. QoS configuration table 450 includes a interleave ID 452, a VC allocated field 454, a required SLA field 456, and an always allocated flag 458. The interrupt ID 452 maps to interrupt ID 440 in interleaving configuration table 438, which enables the virtual channel to be tied to a memory range in the global memory address space. VC allocated field 454 stores an identifier for the allocated VC. Required SLA field 456 stores any required SLA parameters/criteria, such as a minimum bandwidth. Always allocated flag 458 indicates whether the virtual channel is always allocated or not, with the two options being YES or NO.

Figure 5:
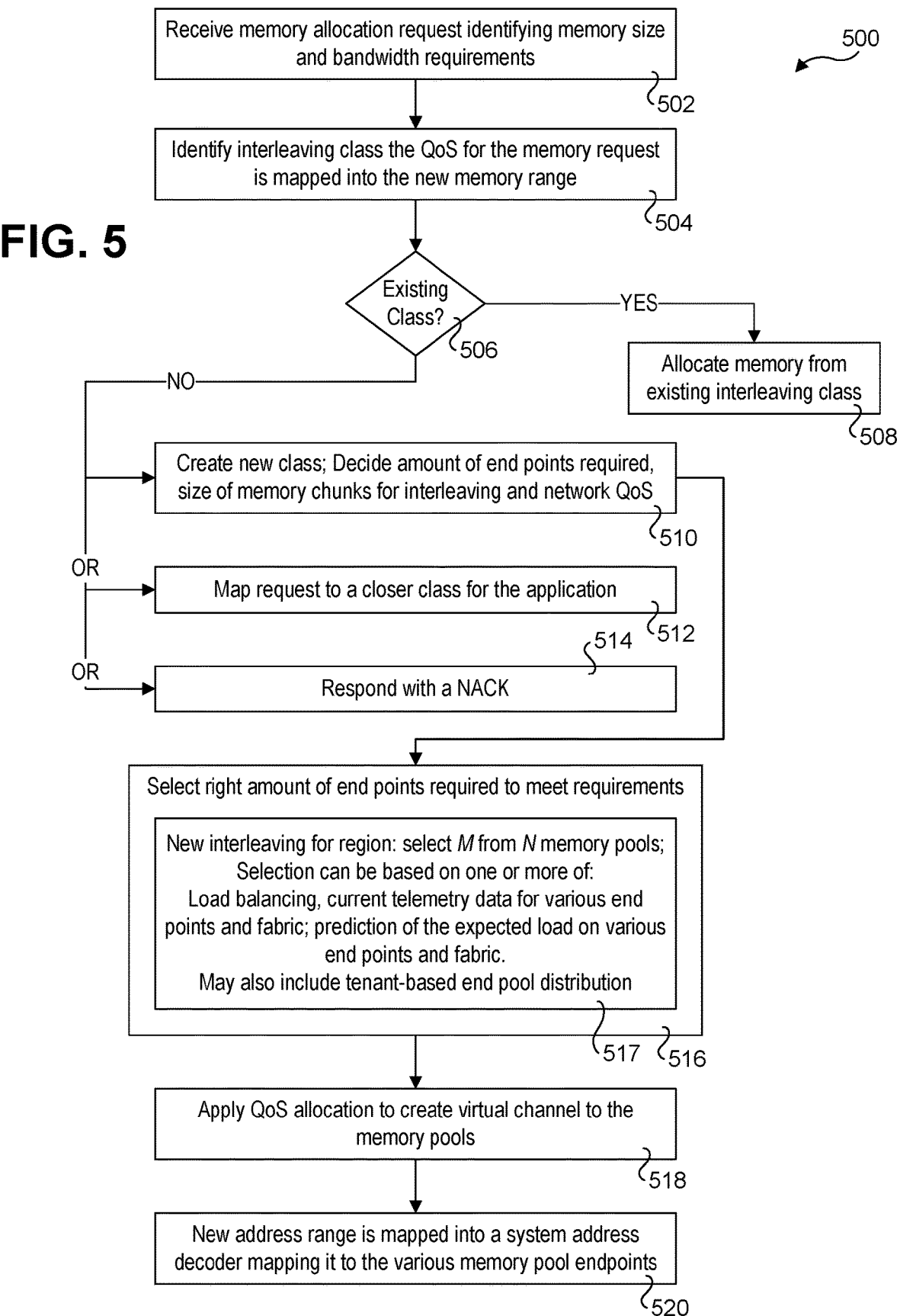
FIG. 5 is a flowchart illustrating operations and logic implemented by the allocating interleaving logic to service a new memory allocation request, according to one embodiment.

FIG. 5 shows a flowchart 500 implemented by allocating interleaving logic 414 to service a new memory allocation request. The process begins in a block 502 in which a memory allocation request is issued from the software stack (on behalf of an application running on a platform or host server) is received at the switch identifying a memory size and bandwidth requirements. In a block 504 the logic identifies to what interleaving class the quality of service is mapped into the new memory range required by the application. The memory bandwidth requirements are used as target.

In a decision block 506 a determination is made to whether an existing interleaving class exists that meets the requirements. If it does, the answer is YES and the logic proceeds to a block 508 in which memory is allocated from the existing interleaving class. If there is no existing interleaving class, the answer to decision block 506 is NO, which leads to three options. Under a first option shown in a block 510, a new interleaving class is created. This will include deciding the amount of end points required, the size of the memory units to be used for interleaving, and the network QoS, as further described an illustrated in blocks 516 and 518. A second option is to map the request to a closer interleaving class for the application, as shown in a block 512. Under the third option shown in a block 514, the logic responds with a Negative ACKnowledgement (NACK) indicating there is no existing interleaving class with available memory to meet the requested requirements (and a new interleaving class will not be created). In one embodiment, memory may be allocated for a non-interleaved region of the global memory space in a conventional manner. These non-interleaved regions are mapped to single memory pools.

In connection with creating a new interleaving class in block 510, the logic proceeds to block 516 to select the right amount of endpoints required to meet the request requirements. As shown in a sub-block 517, a new interleaving region is created by selecting M memory pools to be used from the N available memory pools. The selection can be based on one or more of:
1. Load balancing across the data center.
2. Based on the current telemetry and load of the various end points and fabric.

3. Based on the prediction of the expect load on the various end point and fabric.

The selection may also consider tenant-based memory pool distribution. For example, a given set of memory pools may be allocated as available for a given tenant when the system supports a multi-tenant environment.

Next, in block 518 QoS allocation is applied to create a virtual channel to the M memory pools that were selected. From the perspective of software (the application), subsequent memory accesses using the allocated memory appears as if local memory (system or main memory) is being accessed. In reality, memory is being accessed remotely via at least one switch using multiple datapaths. Concurrently, a similar situation occurs for other applications, including other applications that may be run by separate tenants.

To address this, a virtual channel is created to meet applicable QoS and/or SLA requirements, such as a minimum collective bandwidth. "Collective" is used here since the bandwidth will be the aggregation of bandwidth available via the multiple datapaths. The switch is configured to implement QoS using a prioritization scheme under which the switch can dynamically assign different QoS levels to competing traffic based on observed network or fabric telemetry data that is tracked by network monitoring and QoS logic 412.

The flow is completed in a block 520 in which the new address range is mapped into system address decoder 518 mapping it to the various memory pool endpoints, where the end points are the start and end addresses for each of the M memory pools that are used for interleaving.

Figure 6:
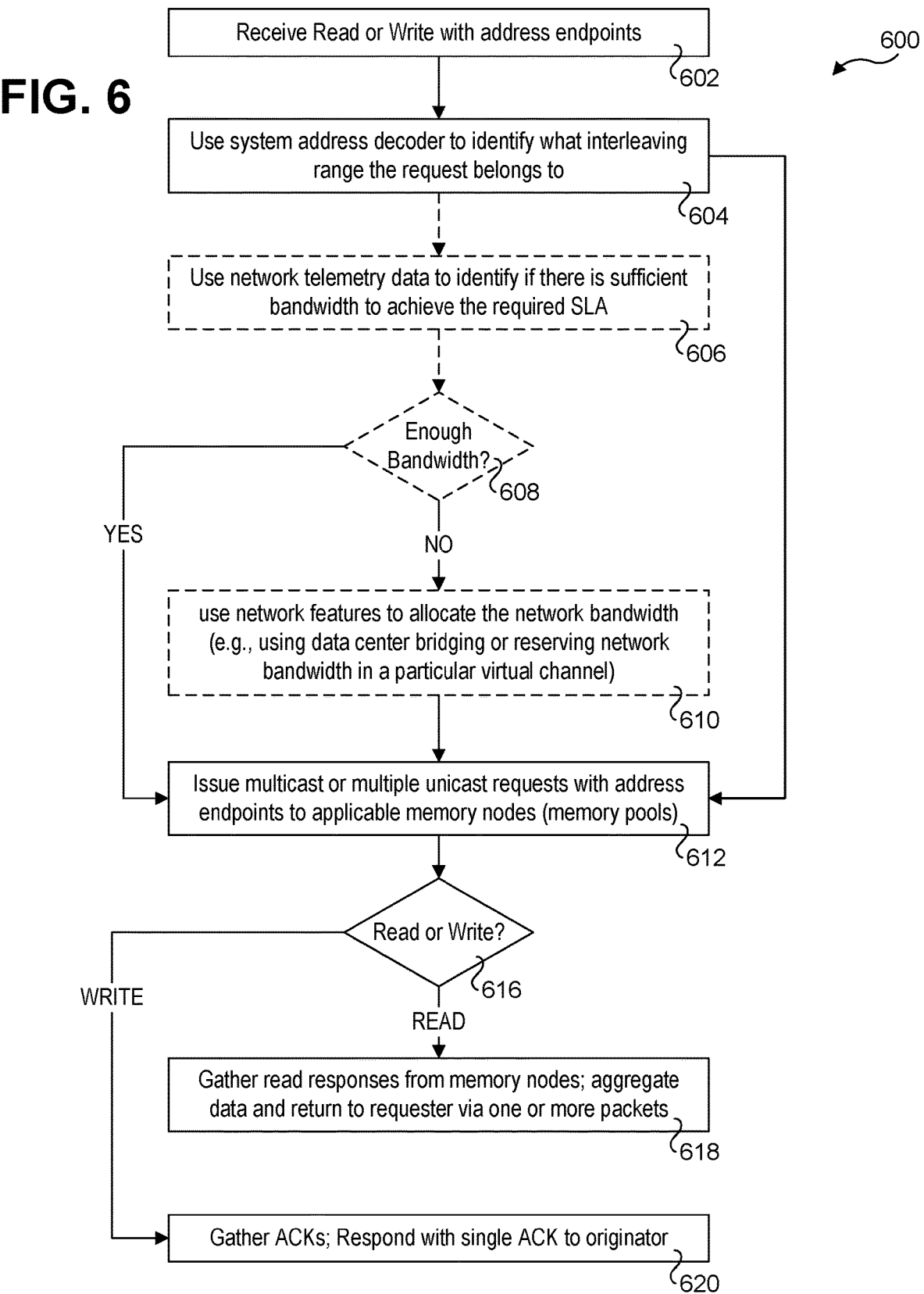
FIG. 6 is a flowchart illustrating operations and logic implemented by the request interleaving logic, according to one embodiment.

FIG. 6 shows a flowchart 600 illustrating operations and logic implemented by request interleaving logic 410. Generally, requested interleaving logic 410 is used to facilitate memory read and right requests/transactions issued by applications. The begins with a memory Read or Write with address endpoints that is issued by an application and received at the switch in a block 602. The address endpoints define one of the start and end addresses of the memory to be accessed or the start address and a size.

Generally, when using local (e.g., system) memory, the unit of storage is the cacheline, such as a 64-Byte cacheline. This is used, in part, to implement memory coherency, since these same cachelines are used by the cache hierarchy on the processor/CPU (e.g., L1, L2, and LLC cache levels). However, this is too granular for efficient access to remote memory, which employ a packetized transport under which data are transmitted in one or more packets. The amount of data in a given Read or Write request may vary from a small about of data to a very large amount of data, depending on the in-memory application's needs and access patterns. For example, for an in-memory database, a Read request might be for multiple rows or columns of data, or even an entire table or index file.

In a block 604 the system address decoder is used to identify the interleaving range the request belongs to. In the example of FIG. 3 discussed above, the interleaved memory regions are 342, 344, and 346. The system address decoder would employ the endpoint addresses and determine which of these interleaved memory regions apply. It is noted that one or more of the interleaved memory regions may be partitioned into sub-regions or the like that may be employed for a given application or tenant.

The next three blocks 606, 608, and 610 shown in dashed outline are optional or may be implemented periodically or may be implemented for selected memory access (such as if the size exceeds a threshold). As illustrated by block 606 and decision block 608 the network telemetry data is used to identify if there is sufficient bandwidth to achieve the required SLA bandwidth. This telemetry data is captured and assessed using network monitoring and QoS logic 412. In one embodiment, this logic may employ a separate table or an additional flag in an existing table, such as QoS configuration table 450, to track the status of the virtual channels as applied to meeting QoS and/or SLA requirements. Accordingly, in decision block 608 the determination may be made by checking the flag or the separate table. If there is not sufficient bandwidth, the answer to decision block 608 is NO, and the logic proceeds to block 610 in which network features are used to allocate additional network bandwidth to meet the QoS/SLA requirements. For example, data center bridging or reserving network bandwidth in a particular data channel may be used, in one embodiment.

If there is enough bandwidth, the answer to decision block 608 is YES and the logic skips block 610 and proceeds to a block 612. Similarly, for memory access request that don't employ the bandwidth check, the logic proceeds from block 604 to block 612. In block 612 a multicast or multiple unicast requests with the address endpoints are issued to applicable memory nodes hosting the memory pools. This is somewhat similar to a broadcast Scatter operation, where the same message is broadcast to multiple nodes that are configured to receive Scatter messages and operate on a portion of the data that has been assigned to them. When a Read or Write request employs a datapath that traverses multiple switches, a multi-cast message (e.g., a broadcast message) may be used. When the remote memory is accessed via a single switch, multiple unicast messages may be issued by the switch to access applicable memory nodes.

Under this approach the message is sent to each of the memory nodes hosting the memory pools used for interleaving. At the same time, it is likely that the data to be accessed is only stored in one of the memory pools (noting a large request may cross more than one data chunk, or whatever other unit is used for interleaving).

As depicted by a decision block 616, the operation in block 618 is performed for a Read, while the operation in block 620 is performed for a Write. Under the read operation, the responses from the memory nodes are gathered, the data returned in the responses are aggregated at the switch, and the switch returns a single response comprising one or more packets (collectively) containing the aggregated data to the requester. In one embodiment, if the requested data is not stored in a given memory pool the memory node may return either an ACK indicating the message was received but there is no data being returned or a NACK (indicating the same). For memory pools storing the data, one or more response packets are prepared and returned to the switch. When the Read data crosses one or more interleave chunks and are stored in two or more memory pools, the data contained in the responses from the two or more memory pools are aggregated by the switch.

A somewhat similar pattern is used for memory Writes. As discussed above, the Write request is multi-cast (or using multiple unicast messages) to the memory nodes hosting the memory pools used for interleaving. As before, a data Write may contain data that crosses an interleave chunk boundary, in which case the data will be written to more than one memory pool. The memory nodes receiving the Write request will inspect the request and determine whether they are storing data within the address endpoints. If they are, the data are written to that/those memory pools and an ACK is returned to the switch indicating a successful Write. For memory node hosting memory pools not storing data within the address endpoints, those memory nodes will return an ACK acknowledging they received the message. The switch knows which memory nodes the Write request was multi-cast or unicast to and tracks the ACKs to confirm an ACK has been returned by each of the memory nodes. The switch then generates a single ACK packet that is returned to the originator of the Write request.

Under an alternative approach, additional mapping information may be maintained by the switch comprising more comprehensive interleave data. Under this approach, the switch will have sufficient interleave mapping information to determine what memory pools store data chunks (or whatever other unit is uses for interleaving) corresponding to the address endpoints of the request. In this case, rather than send a multi-cast message to all the memory nodes hosting memory pools used for interleaving a particular memory region, the requests are only sent using unicast messages to the applicable memory node or nodes. This approach saves additional bandwidth, as it reduces the number of multi-cast and/or unicast messages.

It is noted that this alternative approach generally will not be available for implementations employing multiple switches between an application host and remote memory, particularly if remote memory pools are stored in multiple racks.

In some embodiments, the switch also includes logic to store applicable internal states (such as memory allocation and interleaving decisions) in internal non-volatile memory or external memory (potentially in one or more of connected memory pools) and restore those states when recovering from failure/restart. The switch may also include logic to exchange such states with another redundant switch in configurations when multiple switches are deployed for increased connectivity, throughput, or reliability.

Figure 7:
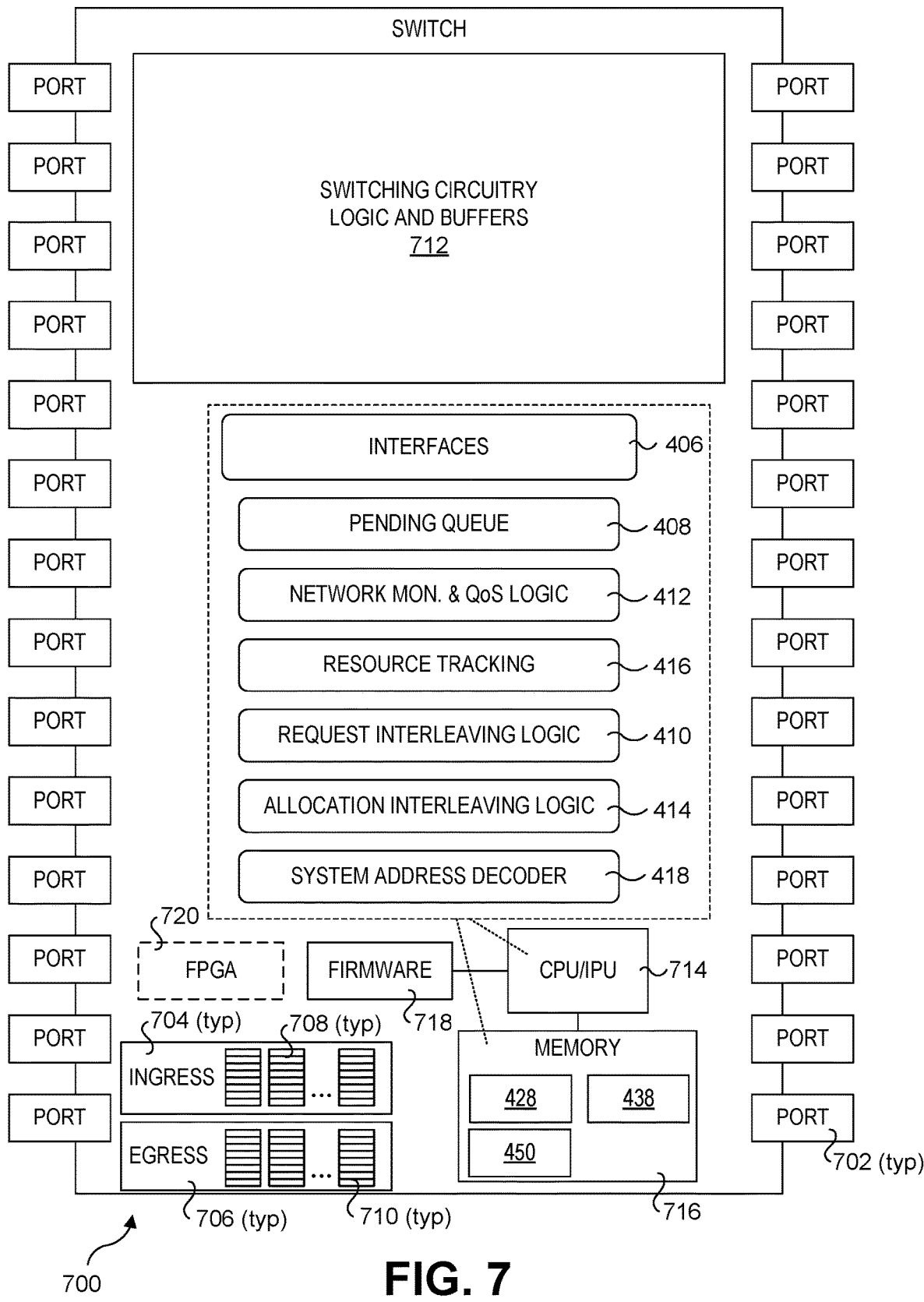
FIG. 7 is a diagram of a switch configured with circuitry and logic for implementing aspects of the switch embodiments disclosed herein.

FIG. 7 shows a switch 700 on which the components and logic shown in FIGS. 4-6 are implemented. Generally, switch 700 employs conventional switch functionality while further adding the functionality employed by the embodiments disclosed herein. Accordingly, the description and illustrating of the conventional switch aspects are abstracted as the components and structures of conventional switches are well-known in the art and outside the scope of this disclosure.

Switch 700 includes a plurality of IO ports 702 that are configured to be coupled to a network or fabric. For example, if the network is an Ethernet network, IO ports 702 are Ethernet ports and including circuitry for processing Ethernet traffic (e.g., Ethernet PHY and MAC circuitry). For a fabric, IO ports 702 may employ applicable Host Fabric Interfaces (HFIs). When switch 700 is a Compute Express Link (CXL) switch, IO ports 702 are configured to support CXL interfaces and implement CXL protocols. Generally, IO ports 702 may be configured to support networks or fabrics employing wired links (e.g., wired cable links) or optical fiber links. In the latter case, IO ports 702 may further include optical modules (not shown for simplicity).

Each IO port 702 includes a set of ingress buffers 704 and egress buffers 706 (only one pair of which is shown for simplicity). The ingress and egress buffers may employ multiple receive queues 708 and transit queues 710. In one embodiment, switch 700 supports QoS using different traffic classes, where some queues are allocated for different QoS levels (such as prioritized traffic associated with high bandwidth data).

The operation of switching functionality and associated ingress and egress buffer utilization is collectively shown via a switching circuitry logic and buffers block 712. This would include, among other circuitry, switchable crossbar circuitry or the like to facilitate transfer of data from queues in ingress buffers to queues in egress buffers. Switching circuitry logic and buffers block 712 may also include logic for implementing Layer 3 and above functionality, in some embodiments (such as traffic classification for QoS and other purposes, detecting invalid packets, etc.).

The various logic and data structures shown and described herein may be implemented on a switch using appropriate embedded logic and circuitry. Such embedded logic may be implemented via execution of software/firmware on one or more processing elements, implementation of hardware-based logic such as preprogrammed logic (e.g., ASICs) and/or programmable logic (e.g., one or more FPGAs), or a combination of the two. In one embodiment, switch 700 includes one or more CPUs or SoCs coupled to memory. In one embodiment, switch 700 employs an IPU SoC chip that includes a plurality of processor cores in combination with FPGA circuitry. In addition, there is switch circuitry produced by various manufacturers such as switch chips that may be used for the conventional switching aspects of switch 700.

In the illustrated example, switch 700 includes a CPU/IPU 714 coupled to memory 716 and a firmware storage device 718. Switch 700 may also include an FPGA 720 in some embodiment. In cases where CPU/IPU 714 is an IPU, the IPU may include one or more embedded FPGAs. In one embodiment, the IPU is an Intel® IPU, such as but not limited to a Mount Evans IPU chip, which includes a multi-core CPU, on-chip memory controllers, and an FPGA that may be programmed for performing various packet processing operations.

Firmware storage device 718 stores firmware instructions/modules that are executed on one or more cores in CPU/IPU 714 to effect the functionality of the components shown in the dashed box that are also shown in FIG. 4 and described above, including interfaces 406, pending queue 408, network monitor and QoS logic 412, resource tracking 416, request interleaving logic 410, allocation interleaving logic 414 and system address decoder 418. The firmware instructions are loaded into memory 716 and executed, with applicable data structures data structures being stored in memory 716. These data structures include request table 428, interleaving configuration table 438, and QoS configuration table 450. Optional FPGA 720 may also be programmed to implement the functionality (in whole or in part) of one or more of the components shown in the dash box.

Figure 8:
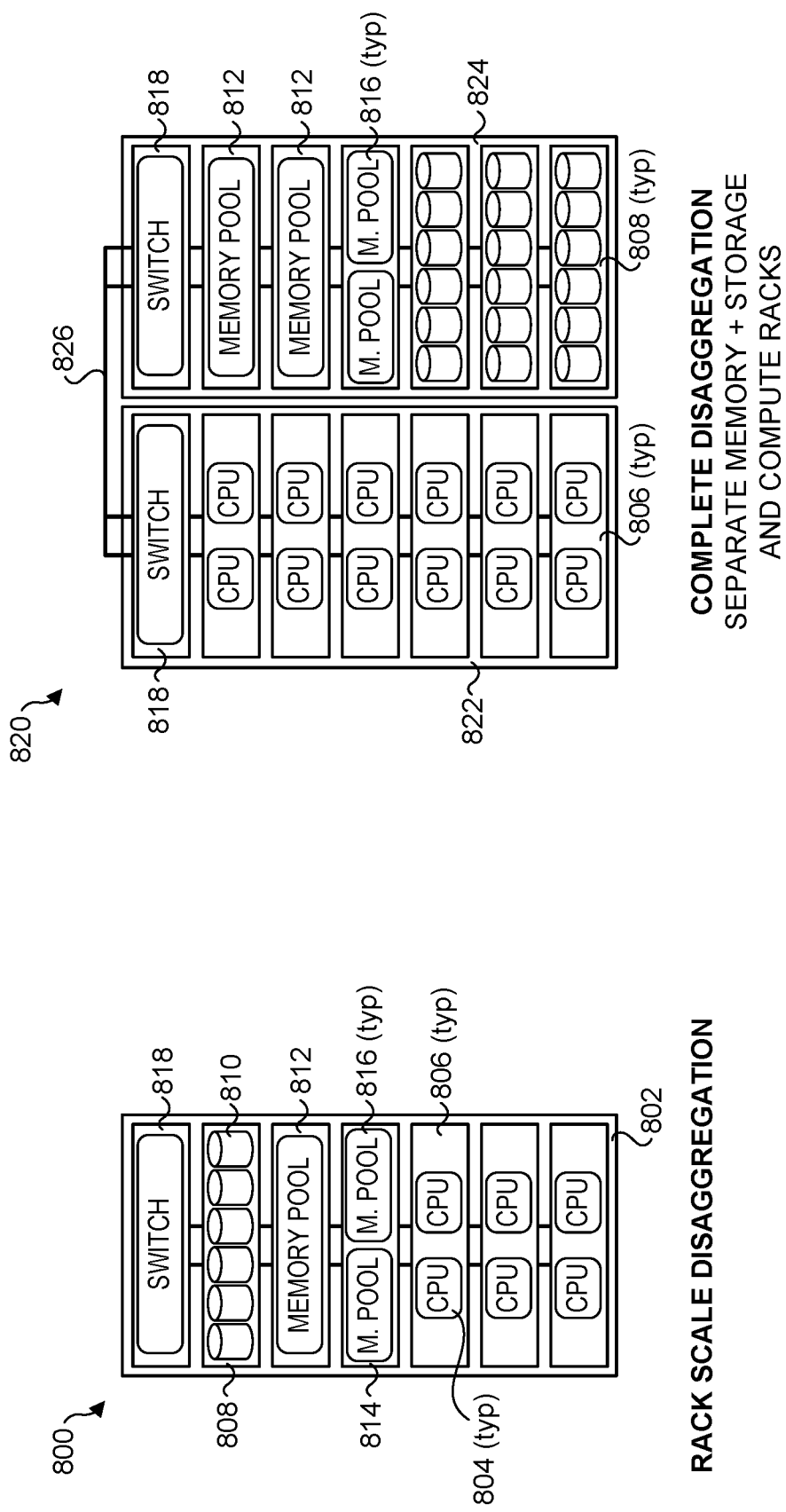
FIG. 8A is a diagram illustrating a first example of a disaggregated architecture comprising rack scale disaggregation.
FIG. 8B is a diagram illustrating a second example of a disaggregated architecture under which computer resources are installed in separate racks from memory and storage resources.
Figure 9:
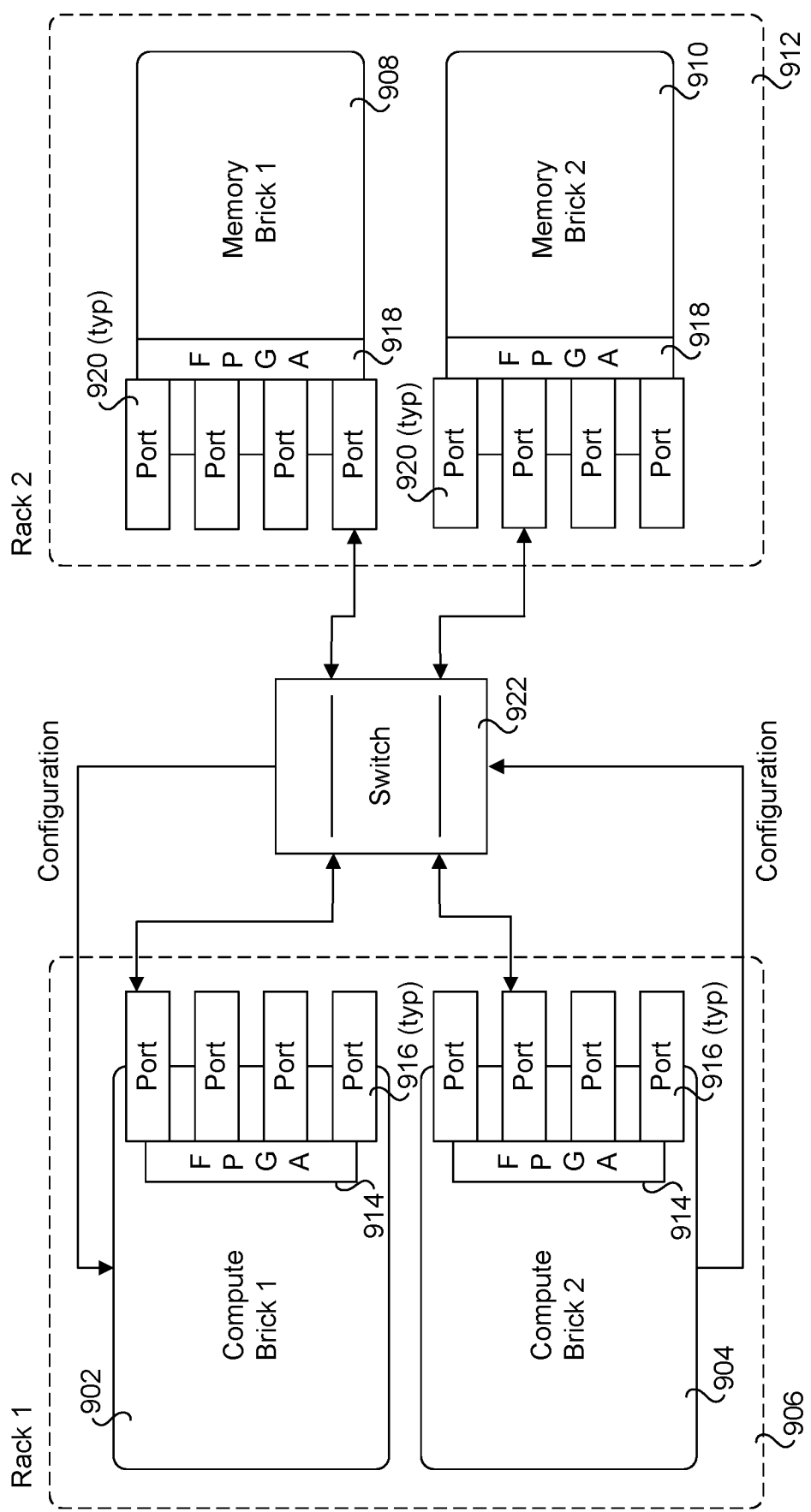
FIG. 9 is a diagram illustrating another example of a disaggregated architecture employing compute bricks and memory bricks.

FIGS. 8A, 8B, and 9 illustrate further examples of system or system environments in which aspects of the embodiments herein may be implemented. Under the rack scale disaggregation architecture 800 of FIG. 8A, the storage, memory, and compute resources are disaggregated as pooled resources in the same rack (802). Under rack scale terminology, the rack is populated with "drawers" or "trays" with "sleds" that are installed in the rack. Generally, a drawer is like a conventional chassis used in racks such as data center racks, except drawers slide out as opposed to chassis being bolted onto the rack frame. However, in the embodiments herein, one or more of chassis, drawers, trays and sleds may be used.

As shown in FIG. 8A, the pooled resources include compute resources 804 in multiple pooled compute drawers 806, a pooled storage drawer 808 including multiple storage devices 810. There are two types of pooled memory resources depicted: a pooled memory drawer 812 and a tray 814 including a pair of pooled memory sleds 816. The various compute, storage, and pooled memory resources are interconnected via a switch 818 shows at the top of rack 802. Such switches are commonly referred to a Top of Rack (ToR) switches whether they are at the top of the rack or not.

Under the complete disaggregation architecture 820 shown in FIG. 8B, the compute resources in pooled compute drawers 806 are installed in a rack 822 and the storage resources in pooled storage drawers 808 and memory pools in pooled memory drawers 812 and pooled memory sleds 816 are deployed in a separate rack 824. A ToR switch 818 is installed at the top of racks 822 and 824. The ToR switches are interconnected via one or more links 826. As will be recognized by those skilled in the art, a data center environment may employ 10's, 100's or even 1000's of racks using rack scale disaggregation 800, complete disaggregation architecture 820, or a combination of the two. The data center environment may also include other types of drawers, sleds, or chassis installed in racks using non-disaggregated architectures, such as blade server chassis and chassis populated with server modules.

FIG. 9 shows an example of disaggregated architecture. Compute resources, such as multi-core processors (CPUs) in blade servers or server modules (not shown) in two compute bricks 902 and 904 in a first rack 906 are selectively coupled to memory resources (e.g., DRAM DIMMs, NVDIMMs, etc.) in memory bricks 908 and 910 in a second rack 912. Each of compute bricks 902 and 904 include an FPGA 914 and multiple ports 916. Similarly, each of memory bricks 908 and 910 include an FPGA 918 and multiple ports 920. The compute bricks also have one or more compute resources such as CPUs, or Other Processing Units (collectively termed XPUs) including one or more of Graphic Processor Units (GPUs) or General Purpose GPUs (GP-GPUs), Tensor Processing Unit (TPU) Data Processor Units (DPUs), Artificial Intelligence (AI) processors or AI inference units and/or other accelerators, FPGAs and/or other programmable logic (used for compute purposes), etc. Compute bricks 902 and 904 are connected to the memory bricks 908 via ports 916 and 920 and switch 922, which represents any type of switch. For example, under embodiments employing Ethernet fabrics, switch 922 may be an Ethernet switch. Optical switches and/or fabrics may also be used, as well as various protocols, such as Ethernet, InfiniBand, RDMA (Remote Direct Memory Access), NVMe-oF (Non-volatile Memory Express over Fabric, RDMA over Converged Ethernet (RoCE), CXL etc. FPGAs 914 and 918 are programmed to perform routing and forwarding operations in hardware.

Generally, a compute brick may have dozens or even hundreds of cores, while memory bricks, also referred to herein as pooled memory, may have terabytes (TB) or 10's of TB of memory implemented as disaggregated memory. An advantage is to carve out usage-specific portions of memory from a memory brick and assign it to a compute brick (and/or compute resources in the compute brick).

The terminology "remote memory" and "memory pool" are used herein. Other terms in the art that may have similar meaning when configured in similar memory architectures include "tiered" memory and "far" memory. In addition, a memory pool is an aggregation of memory that may be shared, and may be deployed under various apparatus and architectures and using various types of memory and memory devices.

In addition to and/or part of the interleaving schemes disclosed herein, hash-based schemes may be used under which an address is hashed to identify a corresponding interleaved data unit, such as a block, chunk, page, etc. of data. Such hash-based schemes may be used for allocating interleaved memory and/or accessing previously allocated interleaved memory.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'M', 'N', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in an environment including a switch connected to one or more host servers running one or more applications and connected to a plurality of pooled memory nodes or memory servers hosting respective memory pools, comprising:
   interleaving memory across the memory pools;
   mapping the interleaved memory into a global memory address space as multiple interleaved memory regions; and
   enabling the one or more applications running on the one or more host servers to access data stored in the memory pools via memory read and memory write requests issued by the one or more applications specifying address endpoints within the multiple interleaved memory regions.

2. The method of claim 1, further comprising:
   creating the multiple interleaved memory regions within the global memory address space having different levels of interleaving; and
   allocating, via the switch, the memory within the multiple interleaved memory regions to applications based on a level of interleaving specified in memory allocation requests received from the one or more applications.

3. The method of claim 1, further comprising:
   allocating respective memory ranges comprising a portion of the global memory address space to a first application and a second application; and
   create a respective first virtual channel and a respective second virtual channel for the respective memory ranges, the respective first virtual channel and the respective second virtual channel configured to support a first minimum bandwidth and a second minimum bandwidth that are different.

4. The method of claim 1, further comprising:
   at the switch in response to receiving a certain memory read request originating from a certain application and specifying a memory address range to be read,
      identifying an interleaved memory region within the global memory address space encompassing the memory address range to be read;
      determining which of the memory pools store the interleaved memory associated with the interleaving memory region that is identified;
      sending a multi-cast read request message or a plurality of unicast read request messages to the plurality of pooled memory nodes or servers hosting the memory pools, the plurality of unicast read request messages specifying the memory address range to be read;

receiving responses from the plurality of pooled memory nodes or servers containing data read from at least two memory pools;
aggregating the data contained in the responses; and
returning the aggregated data to the application.

5. The method of claim 1, further comprising:
at the switch in response to receiving a certain memory write request originating from a certain application, the memory write request containing data and specifying a memory address range in the global memory address space at which the data are to be written,
identifying an interleaved memory region within the global memory address space encompassing the memory address range in the memory write request;
determining which of the memory pools store the interleaved memory associated with the interleaved memory region that is identified;
sending a multi-cast write request message or a plurality of unicast write request messages to the plurality of pooled memory nodes or servers hosting the memory pools, the plurality of unicast write request messages including the data and specifying the memory address range at which the data are to be written;
receiving responses from the plurality of pooled memory nodes or servers containing data read from at least two memory pools;
aggregating the data contained in the responses; and
returning the aggregated data to the one or more applications.

6. The method of claim 1, further comprising:
receiving a memory allocation request from an application having a size;
allocating an address range in an interleaved memory region of the global memory address space;
creating mapping information that maps the address range to the interleaved memory in two or more memory pools used for the interleaved memory region.

7. The method of claim 6, further comprising:
allocating a virtual channel for accessing the interleaved memory in the two or more memory pools, wherein the virtual channel implements at least one datapath for accessing each of the two or more memory pools.

8. The method of claim 7, wherein the memory allocation request specifies a requested bandwidth, further comprising:
monitoring bandwidth utilization of datapaths used for accessing the two or more memory pools and employing one or more Quality of Service (QoS) mechanisms to ensure the virtual channel maintains the requested bandwidth.

9. The method of claim 1, wherein at least one of the one or more applications is an in-memory database application.

10. A switch, configured to be implemented in a network or fabric to which one or more host servers and a plurality of pooled memory nodes or memory servers hosting respective memory pools are communicatively coupled, the switch comprising:
a plurality of Input-Output (IO) ports configured to receive packets from and transmit packets to the one or more host servers and the plurality of pooled memory nodes or memory servers;
a plurality of ingress and egress buffers in which packets are buffered;
switching circuitry and logic to facilitate switch operations including transferring packets from the plurality of ingress buffers to egress buffers; and
other logic and other circuitry to:
interleave memory across the memory pools;
map the interleaved memory into multiple interleaved memory regions in a global memory address space; and
enable applications running on the one or more host servers to access data stored in the memory pools via memory read and memory write requests issued by the applications specifying address ranges within the multiple interleaved memory regions.

11. The switch of claim 10, further including certain logic and certain circuitry to:
facilitate, at least in part, creation of the multiple interleaved memory regions within the global memory address space having different levels of interleaving;
maintain interleaving configuration information for the multiple interleaved memory regions; and
allocate memory within the multiple interleaved memory regions to applications based on a level of interleaving specified in memory allocation requests received from the applications.

12. The switch of claim 10, further including certain logic and certain circuitry to:
allocate respective memory ranges comprising portions of the global memory address space to a first application and a second application; and
create a respective first virtual channel and a respective second virtual channel for the respective memory ranges, the respective first virtual channel and the respective second virtual channel configured to support a first minimum bandwidth and a second minimum bandwidth that are different.

13. The switch of claim 10, further including certain logic and certain circuitry to:
receive a memory read request originating from an application and specifying a memory address range to be read;
identify an interleaved memory region within the global memory address space encompassing the memory address range to be read;
determine which of the memory pools store the interleaved memory associated with the interleaving memory region that is identified;
send a multi-cast read request message or a plurality of unicast read request messages to the plurality of pooled memory nodes or memory servers hosting the memory pools, the read request messages specifying the memory address range to be read;
receive responses from the pooled memory nodes or memory servers containing data read from at least two memory pools;
aggregate the data contained in the responses; and
return the aggregated data to the application.

14. The switch of claim 10, further including certain logic and certain circuitry to:
receive a memory allocation request from an application having a size;
allocate an address range in an interleaved memory region of the global memory address space; and
create mapping information that maps the address range to interleaved memory in two or more memory pools used for the interleaved memory region.

15. The switch of claim 14, wherein the certain logic and the certain circuitry are to:
allocate a virtual channel for accessing the interleaved memory in the two or more memory pools, wherein the virtual channel implements at least two datapaths for accessing the two or more memory pools.

16. The switch of claim 15, wherein the memory allocation request specifies a requested bandwidth, and the certain logic and the certain circuitry are to:

monitor bandwidth utilization of datapaths used for accessing the two or more memory pools and employing one or more Quality of Service (QoS) mechanisms to ensure the virtual channel maintains the requested bandwidth.

17. A system, comprising:

one or more host servers running one or more applications;

a plurality of pooled memory nodes or memory servers hosting respective memory pools; and a switch, including, a plurality of input-output (IO) ports including IO ports communicatively coupled to the one or more host servers and IO ports communicatively coupled to the plurality of memory servers or pooled memory nodes via fabric links, the plurality of IO ports configured for packet reception from and packet transmission to the one or more host servers and the plurality of pooled memory nodes or memory servers;

a plurality of ingress and egress buffers for packet buffering;

switching circuitry and logic to facilitate switch operations including transferring packets from ingress buffers to egress buffers; and logic and circuitry to:

interleave memory across the memory pools;

map the interleaved memory into multiple interleaved memory regions in a global memory address space; and enable applications running on the one or more host servers to access data stored in the memory pools via memory read and memory write requests issued by the applications specifying address ranges within the multiple interleaved memory regions.

18. The system of claim 17, wherein the one or more host servers are installed in a first rack while the plurality of pooled memory nodes or memory servers are installed in one or more other racks separate from the first rack.

19. The system of claim 18, wherein the switch comprises a first switch, further comprising the first rack and a second rack and a second switch, wherein the one or more host servers and the second switch are installed in the first rack and the plurality of pooled memory nodes or memory servers are installed in the second rack, and wherein the first switch is coupled to the second switch via at least one link.

20. An apparatus, configured to be implemented in a network device to which one or more host servers and a plurality of pooled memory nodes or memory servers hosting respective memory pools are communicatively coupled, the network device comprising a plurality of Input-Output (IO) ports configured to receive packets from and transmit packets to the one or more host servers and the plurality of pooled memory nodes or memory servers, the apparatus comprising:

circuitry and logic to:

interleave memory across the memory pools;

map the interleaved memory into multiple interleaved memory regions in a global memory address space; and enable applications running on the one or more host servers to access data stored in the memory pools via memory read and memory write requests issued by the applications specifying address ranges within the multiple interleaved memory regions.

21. The apparatus of claim 20, wherein the circuitry and the logic are to:

facilitate, at least in part, creation of the multiple interleaved memory regions within the global memory address space having different levels of interleaving;

maintain interleaving configuration information for the multiple interleaved memory regions; and allocate the memory within the multiple interleaved memory regions to the applications based on a level of interleaving specified in memory allocation requests received from the applications.

22. The apparatus of claim 20, wherein the circuitry and the logic are to:

allocate respective memory ranges comprising portions of the global memory address space to a first application and a second application; and create a respective first virtual channel and a respective second virtual channel for the respective memory ranges, the respective first virtual channel and the respective second virtual channel configured to support a first minimum bandwidth and a second minimum bandwidth that are different.

23. The apparatus of claim 20, wherein the circuitry and the logic are to:

receive a memory allocation request having a size;

allocate an address range in an interleaved memory region of the global memory address space; and create mapping information that maps the address range to interleaved memory in two or more memory pools used for the interleaved memory region.

24. The apparatus of claim 20, wherein the apparatus comprises a switch chip.

* * * * *